United States Patent Office 3,058,224
Patented Oct. 16, 1962

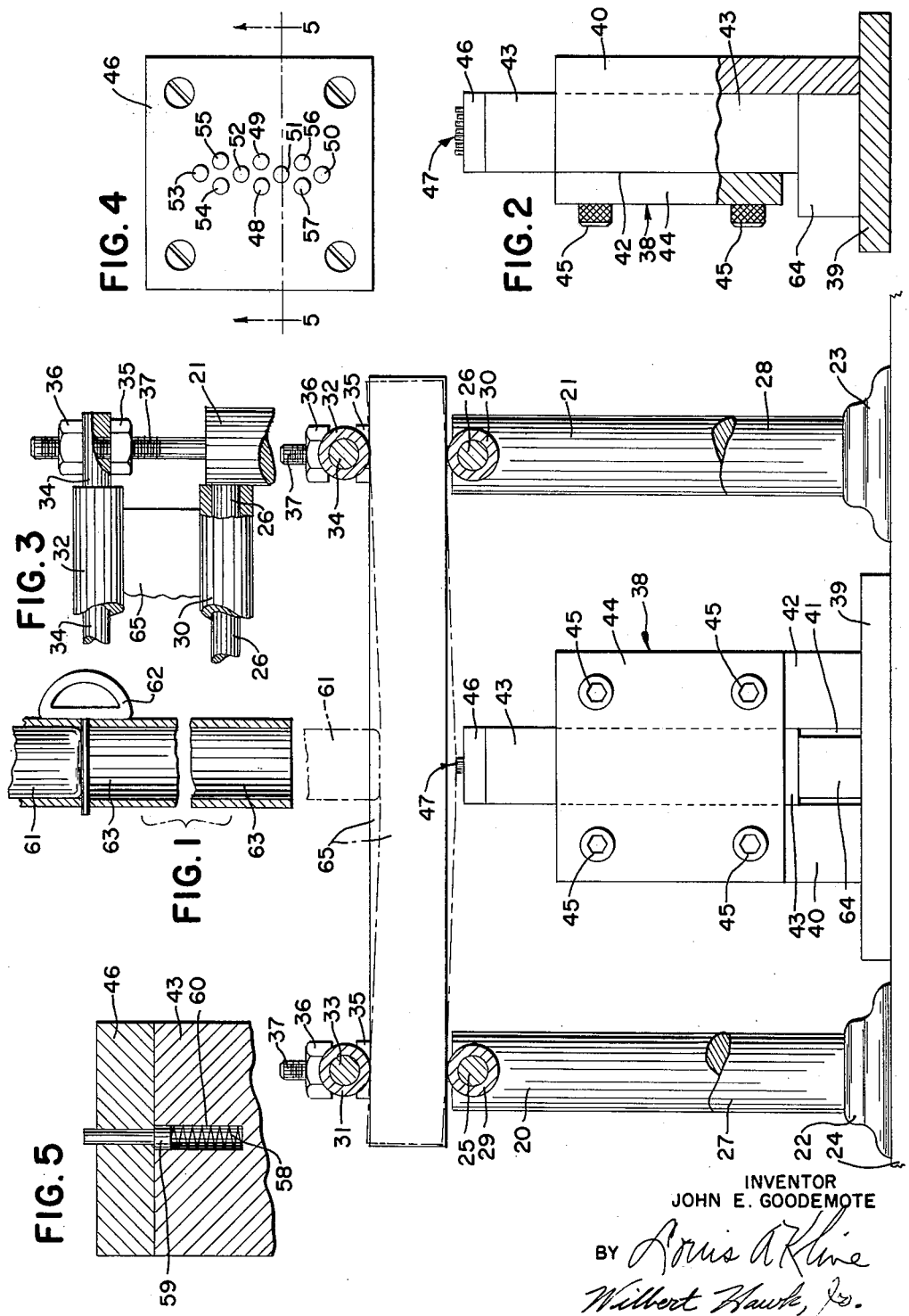

3,058,224
MATERIAL DEFLECTION INDICATOR MEANS
John E. Goodemote, Fairborn, Ohio, assignor to The National Cash Register Company, Dayton, Ohio, a corporation of Maryland
Filed Aug. 28, 1959, Ser. No. 836,684
8 Claims. (Cl. 33—169)

This invention relates generally to a deflection gauge and more particularly to means for measuring and permanently indicating the deflection of a length of material when submitted to the influence of a predetermined load suddenly striking or impinging it.

Deflection gauges, heretofore known, have been found to be entirely inadequate for the purpose desired, due to the effects of an initial shock set up in the material when releasing suddenly a load thereagainst. In view of this shock along with an extremely short period of time within which any deflection amount must be measured, both of which tend at best to give an extremely erratic indicator reading, it is the primary object of the invention to provide a structure which may readily gauge the amount of such material deflection upon the initial impact of the load applied thereto and irrespective of any shock resulting from the initial impact between the material and the striking load.

A further important object of the invention resides in structure permitting indicia to be recorded on the material tested, from which indicia the amount of deflection may readily be calculated and a permanent record thereof actually made on the material tested.

These and other objects and advantages of the invention, including the low cost of production and simplicity in design, will become apparent to those versed in the art in the following description of one particular form of the invention, as illustrated in the accompanying drawing, in which—

FIG. 1 is a view in side elevation and partial section of a structure embodying the invention;

FIG. 2 is a view in end elevation and partial section of a deflection gauge shown in FIG. 1;

FIG. 3 is a fragmentary view in end elevation and partial section of one side of a material support, shown in FIG. 1;

FIG. 4 is a view in top plan and on an enlarged scale of the uppermost surface of the deflection gauge; and FIG. 5 is a view in section on the line 5—5 in FIG. 4.

A pair of spaced apart and vertically aligned posts or columns 20 and 21 are supported in parallel arrangement by any suitable means, herein shown as by means of pedestals 22 and 23 resting on a base plate 24. These columns 20 and 21, adjacent upper end portions thereof, fixedly carry a pair of spaced apart and horizontally aligned shafts 25 and 26, extending outwardly therefrom and engaging a pair of companion columns 27 and 28 (FIG. 1). Rollers 29 and 30 are carried by and extend along the lengths of the respective shafts 25 and 26, respectively between the column pairs 20, 27 and 21, 28.

As best shown in FIGS. 1 and 3, additional rollers 31 and 32 extend along shafts 33 and 34, provided a spaced distance from and parallel to the shafts 25 and 26. A column pin 37 extends upwardly from each of the columns employed and slidingly extends through end portions of shafts 33 and 34. Each pin 37 screw-threadedly carries a pair of nuts 35 and 36, one each located on opposing sides of the shafts 33 and 34, and by means of manipulation of the nuts 35 and 36, the rollers 31 and 32 may be adjusted along the pins 37 to vary the distance between adjacent rollers 29, 31 and 30, 32.

A deflection gauge, generally designated by the numeral 38, rests on the base plate 24 and is located at a zone substantially centrally of the spaced apart columns 20, 21, 27 and 28. In the one particular form of the gauge, as shown herein, there is provided a base member 39 from which there extends an upstanding U-shaped housing 40 having an open area 41 entering therein from a forward side 42. The opening 41 is disposed substantially perpendicular to the base 39 and slidingly receives therein a locating block 43. This block 43 may be selectively shifted toward and away from the base 39 and retained at any desired position by means of a clamp plate 44 frictionally engaging the block 43 upon tightening locking bolts 45 extending through the plate and screw-threadedly engaging the housing 40 forward side 42.

An indicating head 46 is fixedly mounted on the uppermost surface of the block 43 by any suitable means and carries thereon a gauging medium, generally designated by the numeral 47. As disclosed herein, the medium 47 comprises a plurality of spaced apart deflection pins 48, 49, 50, 51, 52, 53, 54, 55, 56 and 57, each slidingly extending through the head 46. As shown in FIG. 5, the upper end portion of each pin 48—57 is yieldingly urged a predetermined distance beyond the head 46 by means of an underlying spring 58 carried within the block 43 and engaging a lower headed end portion 59 of the deflection pin located thereabove. This headed end 59 of each pin is of a diameter greater than that of the major length of the pin, fitting freely within a bore 60 carrying the spring 58 and preventing escapement of the pin from the head 46 by normally abutting compressively the undersurface thereof. With such a construction it is seen that each pin 48—57 may be forced inwardly of the head 56 upon overcoming the spring 58, and then immediately regain its normal extended position when the overcoming force is removed.

A definite pin pattern is provided across the indicating head 46, wherein the centers of all adjacent deflection pins are equally spaced one from another. One successfully tested pin pattern may contain, as shown herein, rows of pins defining a plurality of equilateral triangles along the head 46. As shown in FIG. 4, there is a centrally aligned row containing the spaced apart pins 50, 51, 52 and 53, a row adjacent thereto containing the pins 48, 54, and 57, and a final row opposing the adjacent row containing the remaining pins 49, 55 and 56. For purposes of illustration only, without attempting to limit the invention to such, the equidistant spacings between centers of adjacent deflection pins may be in the neighborhood of two times the common diameter of each pin extending above the head in the overall pattern.

In like manner, a definite pattern is provided between the respective pins 48—57 in yieldingly protruding predetermined but varying distances beyond the indicating head 46. Each pin 48—57 extends a spaced distance beyond the head 46 different than every other pin in the set in order to effectively indicate a material deflection within a range of units between and defined by the maximum and minimum protruding pins. As an example, and in accordance with the illustrative dimensions above set out relative to the pin diameters and spacings therebetween, an effective gauging range is found available in having the various pins 48—57 extend above the head 46 in the following pattern:

| | |
|---|---|
| Pin 48 | .075 of an inch |
| Pin 49 | .070 of an inch |
| Pin 50 | .065 of an inch |
| Pin 51 | .063 of an inch |
| Pin 52 | .061 of an inch |
| Pin 53 | .059 of an inch |
| Pin 54 | .057 of an inch |
| Pin 55 | .055 of an inch |
| Pin 56 | .053 of an inch |
| Pin 57 | .051 of an inch |

With such an arrangement it is seen that the pins 49—57 are spaced varying distances below the uppermost extending pin 48 and present an overall deflection range of .024 of an inch between the uppermost and lowermost pins 48 and 57. This means that pin 49 is .005 of an inch farther away from the specimen to be tested than is pin 48; pin 50 is .010 of an inch farther away than pin 48; pin 51 is .012 of an inch farther away than pin 48; and so on in consecutive increments of .002 of an inch for each of the remaining pins 52 through 57. Of course, the variation between the heights of the pins extending above the head 46 may be increased or decreased to increase or decrease the effective range of the gauge.

While the above example describes each of the pins 48—57 as extending a specific distance above the head 46, it is important to note that it is merely an illustration of one effective pin pattern. In some instances, it may be desirable to extend the uppermost pin 48 a greater or lesser distance above the head 46 and likewise vary the spacings between the intervening pins 49—56, thereby moving the gauging range toward or away from the head 46 and also changing the individual spacings between the various pins employed in the overall unit.

The actual deflection of a material to be tested, such as a specimen 65 as shown in FIG. 1, is brought about by means of a test weight 61 falling freely a predetermined distance under gravitational forces to suddenly strike the specimen. This weight or object 61 is retained in its initial suspended condition above the material 65 by means of a latch pin 62 extending through a guide tube 63 immediately below the undersurface thereof. Of course, the weight and shape of the object 61, as well as the distance it may fall before striking the material 65, may vary in accordance with the characteristics and size of the material to be tested.

In operation, and assuming the test weight 61 is suspended a distance above the rollers 31 and 32, and located substantially centrally of the columns 20, 21, 27 and 28, the length of material 65 is laid across the lower rollers 29 and 30 with its major area extending freely the distance therebetween. The nuts 35 and 36, screwthreadedly carried along the column pins 37, are then manipulated to carry the upper rollers 31 and 32 into line contact with outer end portions of the material 65. These rollers 31 and 32 abut the material 65 at zones directly above the underlying rollers 29 and 30 to yieldingly retain the material therebetween and prevent any tendency of the material to bounce or rebound when deflected under impact of the weight 61.

Although the roller sets prevent rebounding of the material when deflected, they present no interference to the bending or deflecting of the material from its normally planar condition. The adjusted spacing between the roller sets is great enough to overcome any binding with the material which is free to roll longitudinally therebetween under urgence of the force applied. That is, when the deflecting load is applied to the material 65, intermediate the roller sets 29, 31 and 30, 32, the outer ends of the material are yieldingly pulled inwardly between the rollers to compensate for the deflection, as shown by the dash line position in FIG. 1. The material 65 in no way is stretched or permanently deformed since it is free to move in accordance with the load applied centrally thereto.

A marking material, such as one of the common inking fluids and the like, is applied to the uppermost end surfaces of the deflection pins 48—57 before placing the gauge 38 under the material 65 and in axial alignment with the overhanging weight 61. The locating block 43 may then be raised and fixed in relation to the housing 40 to present the outermost extending pin 48 a spaced distance below the material 65 to be tested, as shown by the solid lines in FIG. 1. This distance is made to be approximately that of a calculated amount of deflection for the material tested under the known load factor. That is, assuming the material tested is calculated to deflect a distance "a" under force of the load applied, the adjusting block 43 is raised to present the pin 48 substantially the distance "a" below the material when in a planar condition, and is fixed in that position by means of the clamp plate 44. In so positioning the pin 48, one or more gauge blocks 64 may be placed under the adjusting block 43 to facilitate the adjustment and also assure a fixed position thereof when attained.

The test operation is initiated by removing the latch pin 62 from the tube 63 in order that the test weight 61 may be released to strike the material and force it downwardly against one or more of the deflection pins 48—57. In so doing, a portion of the marking material carried by the pin or pins depressed one after another under urgence of the material being tested is transferred to the undersurface of the material and presents a visible pattern thereon, coinciding with the location of the various pins depressed within the overall pattern presented across the indicating head 46.

With such visible indications presented on the undersurface of the material, the total amount of deflection is quickly and easily calculated therefrom when taking into account the known distance "a" between the deflection pin 48 and the undersurface of the material 65. Merely adding the number of units in that known distance "a" to the difference in height between pin 48 and the last pin depressed during the deflection operation, indicates the amount of deflection accurately calculated to within a tolerance determined by the variance between the last pin depressed and the next lower pin therefrom which was not depressed. For example, and using the illustrative dimensions as above set out, should markings on the tested material indicate that pins 48, 49, 50, 51 and 52, have been depressed, the total deflection of the material would be the sum of the known distance "a" spacing between the pin 48 and the material 65, plus .005 of an inch spacing between pins 48 and 49, plus .005 of an inch spacing between pins 49 and 50, plus .002 of an inch spacing between pins 50 and 51, plus .002 of an inch spacing between pins 51 and 52; giving a total deflection of the known distance "a" plus .014 of an inch, but not as much as the known distance "a" plus .016 of an inch since the next lower pin 53, spaced .002 of an inch below the pin 52, had not been depressed during the testing operation. Of course, a much more accurate calculation may be obtained by decreasing the variance in height between the various pins carried within the overall pattern across the head 46.

If during the testing operation it is seen that none of the pins 48—57 are depressed under the impact of the weight 61, the spacing between the maximum extending pin 48 and the material 65 may be lessened to bring the material deflection within the range of the pins 48—57. If on the other hand, all of the pins 48—57 are depressed under impact of the weight, the spacing between the maximum extending pin 48 and the material 65 may be increased accordingly.

Thus, it is seen that I have provided a rather unique and simplified construction, and yet one which is extremely effective for the purposes intended, and while I have described my invention in detail in the one particular form, it is obvious that structural changes may be made without departing from the spirit of the invention. I, therefore, do not desire to be limited to that precise form beyond the limitations which may be imposed by the following claims.

What is claimed is:

1. A deflection gauge equipped with a plurality of pins resiliently depressible by a piece of test material deformed by a test impact according to the degree of deformation, said pins varying in height and being adapted to make marks on the test material so that the degree of deformation is gauged by the marks identifying the pins depressed.

2. A deflection gauge equipped with a plurality of pins resiliently depressible by a piece of test material deformed by a test impact according to the degree of deformation, a marking material carried by said pins, and said pins varying in height so that the degree of deformation is gauged by said marking material being transferred to said test material upon contact therewith, identifying the pins depressed.

3. A deflection gauge equipped with a plurality of pins resiliently depressible by a piece of test material deformed by a test impact according to the degree of deformation, a marking material carried by said test material, and said pins varying in height so that the deformation is gauged by said marking material being transferred to said pins upon contact therewith, identifying the pins depressed.

4. A deflection gauge equipped with a plurality of pins resiliently depressible by a piece of test material deformed by a test impact according to the degree of deformation, a marking material extending between said pins and said test material, and said pins varying in height so that the degree of deformation is gauged by said marking material being transferred to said test material at zones identifying the pins depressed.

5. A deflection gauge equipped with a plurality of pins resiliently depressible by a piece of test material deformed by a test impact according to the degree of deformation, a marking material extending between said pins and said test material, and said pins varying in height so that the degree of deformation is gauged by said marking material being transferred to said pins depressed.

6. An indicator means adapted to measure the deflection of a test material subjected to a suddenly applied load, comprising a housing; a plurality of deflection pins extending varying distances beyond said housing; a marking material carried by said pins; and said pins being yieldingly depressible under urgence of said material deflected thereagainst, whereby said marking material is transferred to said test material in order corresponding to the pins depressed.

7. The structure of claim 6 in which an adjusting block is slidingly carried by and shiftable to positions beyond said housing; said pins are carried by said block; and clamp means is provided for retaining said block in a shifted position.

8. An indicator means adapted to measure the deflection of a test material subjected to a suddenly applied load, comprising a housing; an adjusting block slidingly carried by and shiftable to positions beyond said housing; clamp means for retaining said block in a shifted position; and a plurality of deflection pins carried by and extending varying distances beyond said block; said pins being yieldingly depressible under urgence of said test material deflected thereagainst, presenting indicia thereon identifying the pins depressed.

References Cited in the file of this patent

UNITED STATES PATENTS

| | | |
|---|---|---|
| 1,617,485 | Hughes | Feb. 15, 1927 |
| 1,637,011 | Schopper | July 26, 1927 |
| 1,820,370 | Aldeborgh et al. | Aug. 25, 1931 |
| 2,469,145 | Baliff | May 3, 1949 |
| 2,892,342 | Goss et al. | June 30, 1959 |
| 2,976,732 | Hautly | Mar. 28, 1961 |